(12) United States Patent
Yasuki

(10) Patent No.: US 7,874,069 B2
(45) Date of Patent: Jan. 25, 2011

(54) METHOD OF MANUFACTURING A GASKET

(75) Inventor: Akira Yasuki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 107 days.

(21) Appl. No.: 12/366,481

(22) Filed: Feb. 5, 2009

(65) Prior Publication Data

US 2009/0144978 A1 Jun. 11, 2009

Related U.S. Application Data

(62) Division of application No. 10/593,705, filed as application No. PCT/JP2005/003817 on Feb. 28, 2005, now abandoned.

(30) Foreign Application Priority Data

Mar. 26, 2004 (JP) ............................. 2004-092840

(51) Int. Cl.
*B23P 15/00* (2006.01)
(52) U.S. Cl. ..................................... 29/888.3
(58) Field of Classification Search ................ 29/888.3, 29/505, 513, 428, 712; 277/317–319, 593, 277/598, 591
See application file for complete search history.

(56) References Cited

U.S. PATENT DOCUMENTS

| 4,635,949 A | 1/1987 | Lucas et al. |
| 4,781,389 A | 11/1988 | Beyer et al. |
| 5,659,132 A | 8/1997 | Novak et al. |

FOREIGN PATENT DOCUMENTS

| GB | 1 170 251 A | 11/1969 |
| GB | 2 019 507 A | 10/1979 |
| JP | 60-188855 | 12/1985 |
| JP | 63-125864 A | 5/1988 |
| JP | 02-157629 A | 6/1990 |
| JP | 04-308339 A | 10/1992 |
| JP | 09-126322 | 5/1997 |
| JP | 2003-056710 | 2/2003 |
| JP | 2003-322256 | 11/2003 |

*Primary Examiner*—John C Hong
(74) *Attorney, Agent, or Firm*—Kenyon & Kenyon LLP

(57) ABSTRACT

A gasket for preventing high-temperature fluid of an internal combustion engine from leaking is located between an adjacent pair of components of the engine. The gasket includes a gasket plate made of an electrically insulating material. The gasket plate has a hole. An annular sealing member is made of a material having a higher heat resistance than the gasket plate. The annular sealing member covers part of the gasket plate that defines the hole. Therefore, the gasket is capable of, for an extended period, preventing metal components in an internal combustion engine from directly contacting each other.

9 Claims, 2 Drawing Sheets

METHOD OF MANUFACTURING A GASKET

This is a division of application Ser. No. 10/593,705 filed 20 Sep. 2006, now abandoned which is a 371 national phase application of PCT/JP2005/003817 filed 28 Feb. 2005, claiming priority to Japanese Patent Applications No. 2004-092840 filed 26 Mar. 2004, the contents of which are incorporated herein by reference.

FIELD OF THE INVENTION

The present invention relates to a gasket such as a cylinder head gasket that is located between the cylinder block and the cylinder head of an internal combustion engine to prevent leakage of combustion gas.

BACKGROUND OF THE INVENTION

A cylinder head gasket is typically provided between the cylinder block and the cylinder head of an internal combustion engine to prevent leakage of combustion gas, coolant, and oil. Various types of such gaskets have been used. For example, Japanese Laid-Open Patent Publication No. 9-126322 discloses such a gasket. The gasket disclosed in the publication includes a gasket body (plate) having water holes and oil holes, and metal grommets each provided in a position corresponding to one of the water holes and the oil holes. Further, a coating layer made of rubber or resin is formed on each of the surfaces of the grommets contacting the cylinder head and the cylinder block, and on each of the surfaces of the grommets contacting the gasket body. The coating layers prevent the metal components (the cylinder head and the grommets, the cylinder block and the grommets, and the grommets and the gasket body) from directly contacting each other.

Besides the above described publication, prior art documents related to the present invention include Japanese Laid-Open Patent Publications No. 2003-322256 and No. 2003-56710.

A typical cylinder head gasket is used in harsh environments, receiving a great compression load from a cylinder head and a cylinder block as head bolts are tightened or heat of combustion gas generated as an engine operates. In addition, if grommets having coating layers are made of a metal that has a different coefficient of thermal expansion from those of the cylinder head and the cylinder block, the amount of thermal expansion of the grommets is different from that of the cylinder head and the cylinder block. Compression load, heat of combustion gas, and a difference of the amount of the thermal expansions can cause the coating layers to come off the grommets. If the coating layers come off, the metal components can directly contact each other. When different types of metal contact each other, galvanic corrosion (electrolytic corrosion) can occur due to the potential difference at the contacting sections depending on the external environment.

SUMMARY OF THE INVENTION

Accordingly, it is an objective of the present invention to provide a gasket that is capable of, for an extended period, preventing metal components in an internal combustion engine from directly contacting each other.

To achieve the above-mentioned objective, the present invention provides a gasket for preventing high-temperature fluid of an internal combustion engine from leaking. The gasket is located between an adjacent pair of components of the engine. The gasket includes a gasket plate made of an electrically insulating material. The gasket plate has a hole. An annular sealing member is made of a material having a higher heat resistance than the gasket plate. The annular sealing member covers part of the gasket plate that defines the hole.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described.

Figure 2:
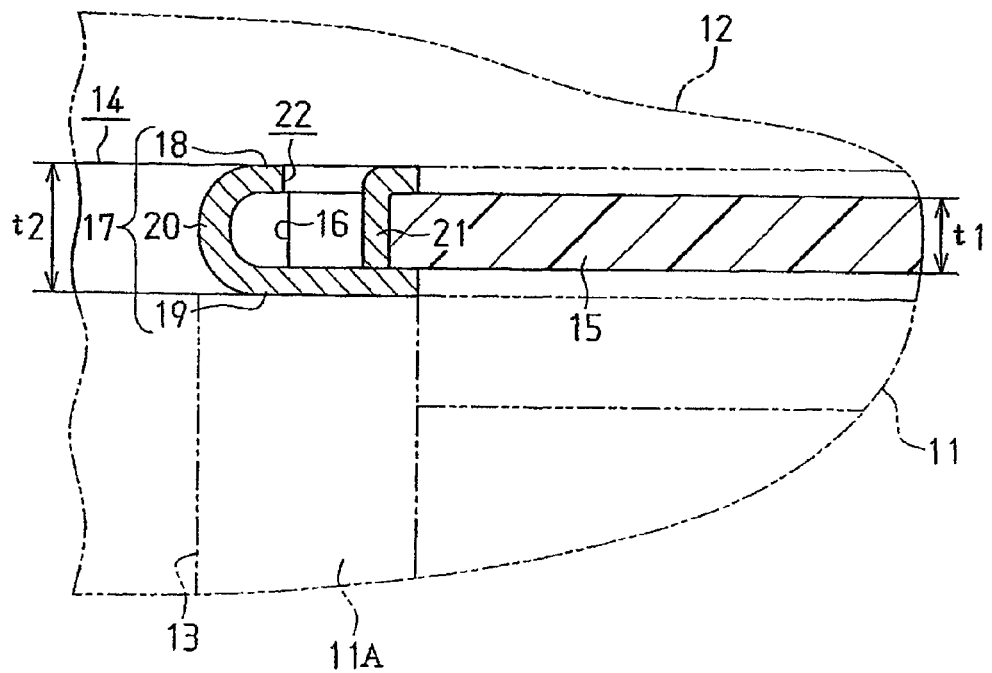
FIG. 2 is a cross-sectional view taken along line 2-2 in FIG. 1.

As shown in FIG. 2, an internal combustion engine includes as its components a cylinder block 11 and a cylinder head 12. The cylinder block 11 and the cylinder head 12 are formed of a metal having a relatively small specific gravity such as an aluminum alloy. Cylinder bores 13 are formed in the cylinder block 11. Each cylinder bore 13 receives a piston (not shown) such that the piston can reciprocate. In each cylinder bore 13, the space above the piston forms a combustion chamber (not shown). In each combustion chamber, mixture of fuel and air is combusted, which produces high-temperature fluid, which is combustion gas. The heat and combustion pressure of the combustion gas are transmitted to the cylinder block 11 and the cylinder head 12, and act between the cylinder block 11 and the cylinder head 12.

A cylinder head gasket 14 is located between the cylinder block 11 and the cylinder head 12. The gasket 14 contacts sealed portions of the cylinder block 11 and the cylinder head 12 at a predetermined surface pressure (sealing surface pressure), thereby preventing combustion gas from leaking between the cylinder block 11 and the cylinder head 12 to the outside. In this embodiment, the sealed portions include an area about each cylinder bore 13 on the upper surface of the cylinder block 11 and an area about each cylinder bore 13 on the lower surface of the cylinder head 12.

A gasket plate 15, which occupies most of the gasket 14, is formed of a single plate member. The entire plate member is made of an electrically insulating material that has a great electric resistance. For example, synthetic resin is suitable for the material of the plate member. Particularly, fluorocarbon resin (for example, polytetrafluoroethylene) having heat resistance is preferable. No coating made of rubber and synthetic resin as disclosed in Japanese Laid-Open Patent Publication No. 9-126322 is formed on the surface of the gasket plate 15. In FIG. 2, a space appears to be created between the cylinder head 12 and the gasket plate 15, and between the gasket plate 15 and the cylinder block 11, respectively. However, in reality, the gasket plate 15 contacts both the cylinder head 12 and the cylinder block 11.

Flat circular holes 16 are formed in the gasket plate 15 at positions corresponding to the cylinder bores 13. An annular sealing member, which is a grommet 17, is engaged with each hole 16. Each grommet 17 is made of a material that has a higher heat resistance than the gasket plate 15. For example, metal is suitable for the material of the grommets 17. In this embodiment, stainless steel is used for the grommet 17.

Each grommet 17 is annular and has a pair of upper and lower holding portions 18, 19, and a cylindrical coupler portion 20 for coupling the holding portions 18 and 19 to each other. The holding portions 18, 19 hold the gasket plate 15 at the side corresponding to the cylinder block 11 and at the side corresponding to the cylinder head 12. Each grommet 17 covers the wall of and areas about one of the holes 16. That is, the grommet 17 covers part of the gasket plate 15 that defines the hole 16. The holding portions 18, 19 and the coupler portion 20 of each grommet 17 are formed by bending a single plate member. In other words, each grommet 17 is swaged to the corresponding hole 16.

Figure 4:
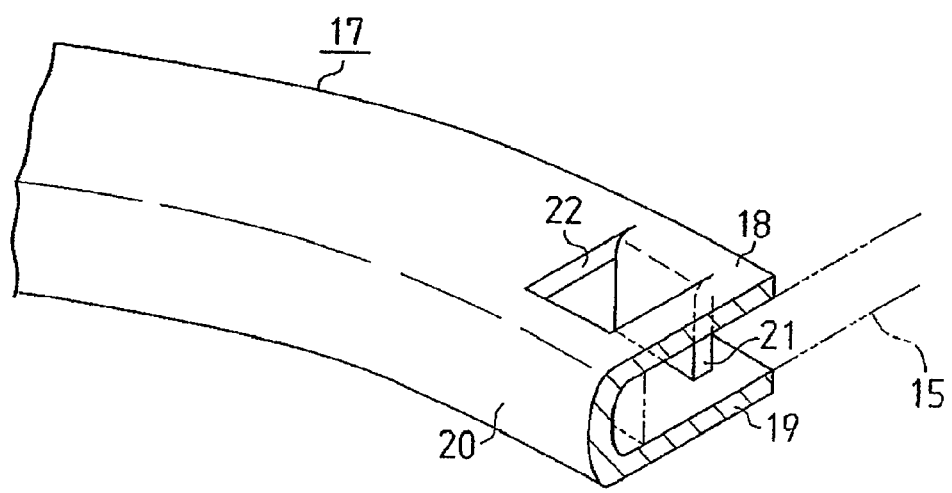
FIG. 4 is a partial perspective view illustrating a grommet in the gasket of FIG. 1.

As shown in FIGS. 2 and 4, each grommet 17 has deformation restricting portions 21. The deformation restricting portions 21 restricts deformation of at least one of the holding portions 18 and 19 along the thickness of the gasket plate 15 (vertical direction as viewed in FIG. 2). The deformation restricting portions 21 are preferably provided at a plurality of positions along the circumferential direction of each grommet 17 (see FIG. 1). In this case, the deformation restricting portions 21 are preferably arranged at a constant angular interval. Each deformation restricting portion 21 has a vertical length that is substantially equal to the thickness t1 of the gasket plate 15. Each deformation restricting portion 21 is located between the holding portions 18, 19 of the grommet 17, and extends along the thickness of the gasket plate 15. That is, incisions are formed in the holding portion 18 (upper one as viewed in FIG. 2) of each grommet 17. Each section of the holding portion 18 surrounded by one of the incisions is bent substantially perpendicularly toward the holding portion 19 (lower one as viewed in FIG. 2). The bent sections function as the deformation restricting portions 21. The distal end of each deformation restricting portion 21 (lower end as viewed in FIG. 2) contacts or is close to the upper surface of the holding portion 19. With the deformation restricting portions 21 formed, rectangular through holes 22 are opened at a plurality of positions of the holding portion 18 (see FIG. 1).

Figure 1:
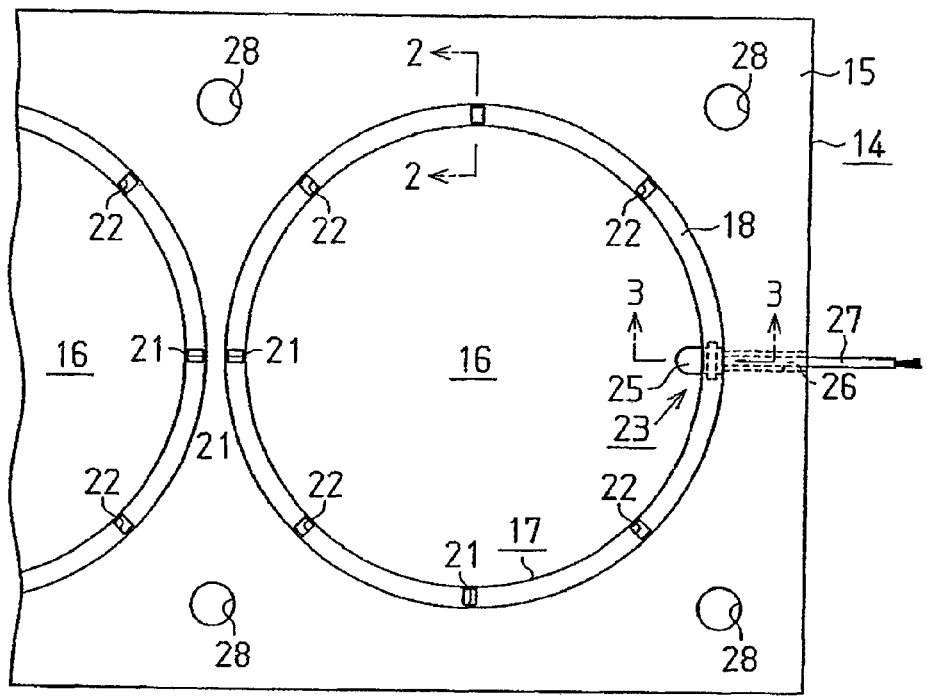
FIG. 1 is a partial plan view illustrating a cylinder head gasket according to one embodiment of the present invention.
Figure 3:
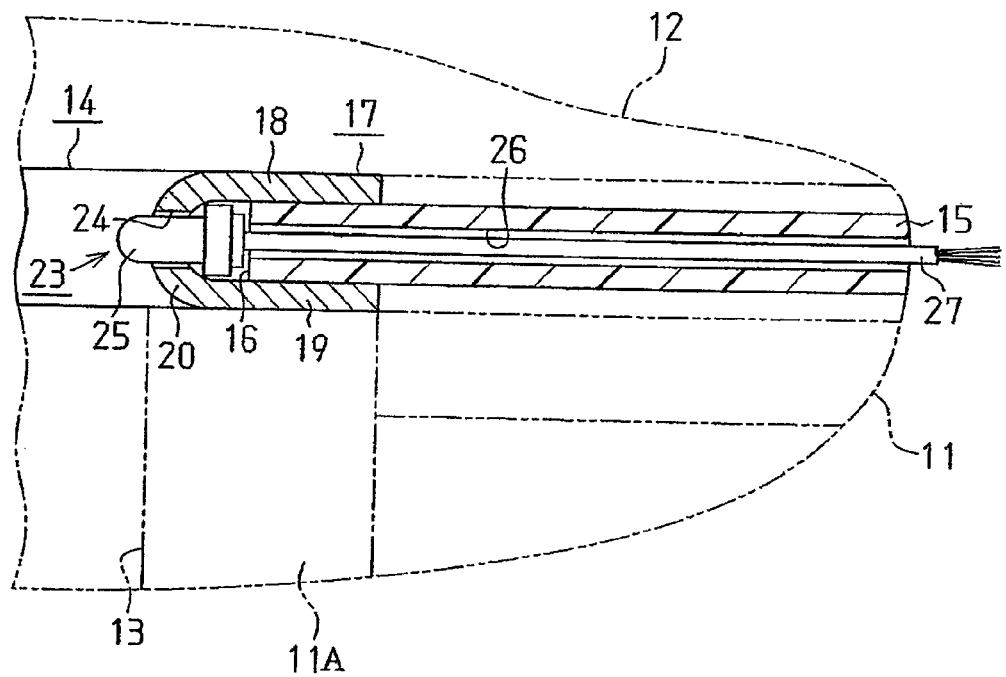
FIG. 3 is a cross-sectional view taken along line 3-3 in FIG. 1.

The gasket 14 of this embodiment has a sensors 23 corresponding to one of the cylinders as shown in FIGS. 1 and 3. The sensor 23 detects the combustion state of the corresponding cylinder. For example, the sensor 23 detects the components of combustion gas and ions in combustion gas. Specifically, an attachment hole 24 is formed in the coupler portion 20 of one of the grommets 17 (see FIG. 3). The sensor 23 has a sensor body 25 that occupies most of the sensor 23 and is located between the holding portions 18, 19. Part of the sensor body 25 extends through the attachment hole 24 and located inside the corresponding combustion chamber. A guide hole 26 is formed in the gasket plate 15 in advance. One end of the guide hole 26 (left end as viewed in FIG. 3) is opened at the wall of the corresponding hole 16. The other end of the guide hole 26 (right end as viewed in FIG. 1) is opened at the outer wall of the gasket plate 15. A lead 27 extending from the sensor body 25 is drawn to the outside of the gasket plate 15 through the guide hole 26. The guide hole 26 may be formed when the gasket plate 15 is molded. Alternatively, the guide hole 26 may be formed after the gasket plate 15 is molded.

When the gasket 14 as described above is used, the gasket 14 is placed on the cylinder block 11 while adjusting the positions of the grommets 17 so that each grommet 17 is located about the corresponding cylinder bore 13. Then, the cylinder head 12 is placed on the gasket 14. In this state, the lower surface of each grommet 17 directly contacts, for example, the upper surface of a cylinder liner 11A, and the upper surface of the grommet 17 directly contacts the lower surface of the cylinder head 12. Subsequently, from above the cylinder head 12, head bolts (not shown) are inserted into the cylinder head 12 and the gasket 14 and screwed to thread holes in the cylinder block 11. FIG. 1 shows holes 28 into which the head bolts are inserted.

Fastening the head bolts causes the grommets 17 to receive vertical compression loads from the cylinder block 11 and the cylinder head 12. Then, the compression loads increase the sealing surface pressure of the gasket 14 applied to the cylinder block 11 and the cylinder head 12. The distance between the outer surfaces of the holding portions 18, 19 of each grommet 17 (thickness t2 of each grommet 17) is greater than the thickness t1 of the gasket plate 15. Therefore, the sealing surface pressure is particularly high at the grommets 17.

Even if the compression loads due to fastening of the head bolts are applied to the grommets 17, the deformation restricting portions 21 maintain the distance between the holding portions 18 and 19 at a constant value that corresponds to the thickness t1 of the gasket plate 15. Unless a load so great that it deforms the deformation restricting portions 21 is applied to the grommets 17, the holding portions 18 and 19 are not deformed with respect to the thickness of the gasket plate 15 to narrow the space between the holding portions 18 and 19. That is, permanent settling of the grommets 17 does not take place.

When the internal combustion engine is operated, mixture of air and fuel is combusted in the combustion chambers. The heat of combustion gas, generated as the result of combustion, is transmitted to the cylinder block 11, the cylinder head 12, and the gasket 14. In the gasket 14, the combustion gas directly contacts the grommets 17. Since the grommets 17 are made of a metal having a high heat resistance (stainless steel), the grommets 17 are hardly deformed or degraded by heat. The grommets 17 and the gasket plate 15, of which the sealing surface pressure is increased, prevents the combustion gas from leaking between the cylinder block 11 and the cylinder head 12.

Since the gasket plate 15 is made of a synthetic resin, the heat resistance of the gasket plate 15 is not significantly high. However, the grommets 17 are engaged with the holes 16, so that the wall surface and areas about each hole 16 of the gasket plate 15 (part of the gasket plate 15 that defines the hole 16) are covered with the holding portions 18, 19 and the coupler portion 20 of the corresponding grommet 17. Therefore, the gasket plate 15 is protected by the grommets 17 and does not directly contact the combustion gas. The heat of the combustion gas is transmitted to the gasket plate 15 through the grommets 17. Compared to a case where combustion gas directly contacts the plate, the gasket plate 15 is less affected by the heat.

The heat of combustion gas can be a cause of permanent settling of the grommets 17. However, as described above, the deformation restricting portions 21 maintain the distance between the holding portions 18 and 19 at a constant value that corresponds to the thickness t1 of the gasket plate 15. Therefore, even in a state where the compression load due to fastening is applied to the grommets 17, permanent settling of the holding portions 18, 19 due to the heat of combustion gas is suppressed.

In the internal combustion engine according to the present embodiment, the gasket 14 is placed between the cylinder block 11 and the cylinder head 12. The upper surface of the cylinder block 11 contacts the lower surface of the gasket 14, and the lower surface of the cylinder head 12 contacts the upper surface of the gasket 14. The gasket plate 15, which occupies most of the gasket 14, is formed of an electrically insulating synthetic resin. The cylinder block 11 and the cylinder head 12 are formed of a metal such as an aluminum alloy. Therefore, the metal sections of the cylinder block 11, the gasket 14, and the cylinder head 12 do not contact each other. In other words, no metal-to-metal contact is made.

When different types of metal contact each other, galvanic corrosion (electrolytic corrosion) can occur due to the potential difference at the contacting sections depending on the external environment. However, in this embodiment, since the cylinder block 11 and the cylinder head 12 contact the gasket plate 15, which is made of an electrically insulating material, or a synthetic resin, such electrolytic corrosion is suppressed.

Since the grommets 17 are made of metal (stainless steel), metal-to-metal contact is made in sections of the cylinder block 11 and the cylinder head 12 that correspond to the grommets 17. However, the grommets 17 are engaged with the holes 16 located away from passages of liquid (for example, coolant), which can be a cause of corrosion. Therefore, electrolytic corrosion of the cylinder block 11 and the cylinder head 12 hardly causes serious problems.

The embodiment described above provides the following advantages.

(1) The gasket plate 15, which occupies most of the gasket 14, is formed of a synthetic resin. Therefore, when the gasket 14 is installed in an internal combustion engine, the cylinder block 11 and the cylinder head 12, which are made of metal, contact the electrically insulating gasket plate 15. Since no metal-to-metal contact is made at sections corresponding to the gasket plate 15, electrolytic corrosion, which would otherwise be caused, is suppressed. This increases the number of types of metal that can be used for the cylinder block 11 and the cylinder head 12. Among the types of metals, magnesium and alloys thereof, which are relatively susceptible to electrolytic corrosion, are included.

Since the gasket plate 15 is made of a synthetic resin and electrically insulating, no coating of rubber or resin needs to be formed on the surface of the gasket plate 15 to make the gasket plate 15 electrically insulating. Therefore, unlike an art described in the background section (Japanese Laid-Open Patent Publication No. 9-126322), there is no possibility that the coating comes off the gasket plate and the electrical insulating property of the gasket plate is eliminated. On the contrary, metal-to-metal contact is prevented for an extended period of time in the present embodiment.

(2) In the gasket plate 15, the holes 16 are formed at positions that correspond to the cylinder bores 13. The grommets 17, each including the holding portions 18, 19 and the coupler portion 20, are engaged with the holes 16. The distance between the outer surfaces of the holding portions 18, 19 of each grommet 17 (thickness t2 of each grommet 17) is greater than the thickness t1 of the gasket plate 15. The grommets 17 contact the cylinder block 11 and the cylinder head 12 at a sealing surface pressure higher than the surface sealing pressure of the gasket plate 15 applied to the cylinder block 11 and the cylinder head 12. Therefore, combustion gas is prevented from leaking to the outside between the cylinder block 11 and the cylinder head 12 mainly by the grommets 17.

(3) The grommets 17 are made of a material that has a higher heat resistance (metal such as stainless steel) than the gasket plate 15. Although the heat of combustion gas is directly transmitted to the grommets 17, the heat creates few problems. That is, the heat hardly deforms or degrades the higher heat resistance grommets 17.

(4) Each grommet 17 includes the pair of annular holding portions 18, 19, which hold the gasket plate 15 from both sides, and the coupler portion 20 located in the corresponding hole 16 to couple the holding portions 18, 19 to each other. Thus, the wall surface of and areas about each hole 16 are covered by the corresponding grommet 17, which protects the gasket plate 15 from high-temperature combustion gas. In other words, the gasket plate 15, particularly sections about the holes 16 are prevented from being affected by heat.

(5) The holding portions 18, 19 and the coupler portion 20 of each grommet 17 are formed by bending a single plate member. Thus, compared to a case where each grommet 17 is formed by assembling separately prepared holding portions 18, 19 and a coupler portion 20, the present embodiment reduces the number of parts.

(6) In a case where there is no structure for maintaining the distance between the holding portions 18, 19 of each grommet 17, permanent settling of the grommets 17 can occur if compression load due to fastening of the head bolts and heat of combustion gas cause permanent settling of the gasket plate 15, thereby reducing the thickness of the gasket plate 15.

On the contrary, each grommet 17 of the present embodiment has the deformation restricting portions 21 extending along the thickness of the gasket plate 15 between the holding portions 18, 19. The length of each deformation restricting portion 21 is substantially the same as the thickness t1 of the gasket plate 15. Therefore, when a great compression load is applied to the grommets 17 by the cylinder block 11 and the cylinder head 12 or when the heat of combustion gas is transmitted to the grommets 17, the deformation restricting portions 21 maintains the distance between the inner surfaces of the holding portions 18, 19 (substantially the same as the thickness t1 of the gasket plate 15). That is, deformation of the holding portions 18, 19 along the thickness of the gasket plate 15 is restricted. In other words, permanent settling of the holding portions 18, 19 is prevented. As a result, the sealing property of the gasket 14 is not degraded due to permanent settling.

(7) Incisions are formed in the holding portion 18 of each grommet 17, and the corresponding parts of the holding portion 18 are bent toward the other holding portion 19, thereby forming the deformation restricting portions 21. That is, part of the holding portion 18 function as the deformation restricting portions 21. This configuration reduces the number of parts compared to a case where deformation restricting portions 21 are separately prepared from the grommets 17.

(8) If the gasket plate 15 is formed by laminating a plurality of thin plates, the guide hole 26, through which the lead 27 is passed through, cannot be easily formed in the gasket plate 15.

In this respect, the gasket plate 15 of the present embodiment is formed of a single synthetic resin plate member, and the guide hole 26 for passing lead 27 through the gasket plate 15 is formed. The guide hole 26 is relatively easily formed. Specifically, the guide hole 26 may be formed when molding the gasket plate 15. Alternatively, the guide hole 26 may be bored after the gasket plate 15 is molded.

(9) In a case where the gasket plate 15 is made of metal and the lead 27 of the sensor 23 is passed through the guide hole 26 formed in the metal gasket plate 15, when the insulating coating of the lead 27 comes off for some reason, the lead 27 can contact the metal gasket plate 15 and establish a short circuit. In this respect, since the gasket plate 15 of the present embodiment is made of an electrically insulating synthetic resin, no short circuit will be established even if such coming off of insulating coating of the lead 27 occurs.

The invention may be embodied in the following forms.

The sealing surface pressure of the gasket 14 applied to the cylinder block 11 and the cylinder head 12 is preferably even at any circumferential location on the grommets 17. However, in reality, due to the construction of the cylinder block 11 and the cylinder head 12, the sealing surface pressure of the gasket 14 is difficult to be made uniform. On the other hand, the sealing surface pressure of each grommet 17 varies according to the heights of the deformation restricting portions 21. Such variation of the sealing surface pressure of the grommets 17 may be absorbed by changing the heights of the deformation restricting portions 21. That is, the height of the deformation restricting portion 21 located at a section of a low sealing surface pressure may be made higher than the height of the deformation restricting portion 21 located at a section of a high sealing surface pressure. By setting the heights of the deformation restricting portions 21 allowing for variation of the sealing surface pressure, the sealing surface pressure of each grommet 17 is made uniform or substantially uniform at any circumferential location.

The gasket plate 15 needs to be made of an electrical insulating material. As long as this requirement is satisfied, any material other than synthetic resin may be used.

The annular sealing members (the grommets 17) need to be made of a material that has a higher heat resistance than the gasket plate 15. As long as this requirement is satisfied, any material other than metal (stainless steel) may be used.

The present invention may be applied to a gasket to which the sensor 23 is not attached.

The deformation restricting portions 21 may be prepared separately from the grommets 17.

In the illustrated embodiment the grommets 17 are swaged to the holes 16. However, the annular sealing members may be engaged with the holes 16 in a different manner.

The present invention may be applied to a gasket other than the cylinder head gasket 14. For example, in a case where the cylinder head 12 and an exhaust manifold are used in combination in an internal combustion engine, the present invention may be applied to an exhaust manifold gasket located between the cylinder head 12 and the exhaust manifold. The present invention may be applied to a gasket that prevents high-temperature fluid other than combustion gas from leaking.

The present examples and embodiments are to be considered as illustrative and not restrictive and the invention is not to be limited to the details given herein, but may be modified within the scope and equivalence of the appended claims.

What is claimed is:

1. A method of manufacturing a gasket for preventing high-temperature fluid of an internal combustion engine from leaking, the gasket being configured for positioning between an adjacent pair of components of the engine, wherein the method of manufacturing the gasket comprises the steps of:
    providing a gasket plate made of an electrically insulating material, the gasket plate having a hole;
    covering at least part of the gasket plate that defines the hole with an annular sealing member made of a material having a higher heat resistance than the gasket plate, wherein the annular sealing member includes:
        a pair of holding portions that hold the gasket plate in between; and
        a coupler portion that couples the holding portions to each other in the hole; and
    forming an incision in one of the holding portions; and
    bending part of the one of the holding portions where the incision is formed toward the other holding portion to form a deformation restricting portion that restricts deformation of the annular sealing member along the thickness of the gasket plate.

2. The method according to claim 1, wherein the high-temperature fluid is combustion gas generated as the engine operates.

3. The method according to claim 1, wherein the pair of the components are a cylinder block and a cylinder head, the cylinder block having a cylinder bore, and wherein the hole is formed to correspond to the cylinder bore.

4. The method according to claim 1, wherein the electrically insulating material is a synthetic resin.

5. The method according to claim 1, wherein the annular sealing member is formed by bending a plate member.

6. The method according to claim 1, wherein the deformation restricting portion extends along the thickness of the gasket plate between the holding portions.

7. The method according to claim 6, wherein the deformation restricting portion has a length that is substantially equal to the thickness of the gasket plate.

8. The method according to claim 1, wherein the internal combustion engine has a cylinder, and the gasket plate is formed of a single plate member, the gasket further comprising:
    a sensor for detecting a state in the cylinder, the gasket plate having a guide hole, wherein a lead extending from the sensor passes through the guide hole.

9. The method according to claim 1, wherein the high heat resistance material is a stainless steel.

\* \* \* \* \*